Patented Jan. 15, 1952

2,582,378

UNITED STATES PATENT OFFICE 2,582,378

PROCESS OF PRODUCING GALLIUM

Ralph Waldo Brown, East St. Louis, Ill., assignor to Aluminum Company of America, Pittsburgh, Pa., a corporation of Pennsylvania No Drawing. Application September 17, 1947, Serial No. 774,687

2 Claims. (Cl. 204—105)

This invention relates to the production of gallium, and relates particularly to recovering gallium from alkali metal aluminate solutions. This application is a continuation-in-part of my application Serial No. 740,981, filed April 11, 1947, entitled "Process for Treating Alkali Metal Aluminate Solutions."

Gallium oxide can be extracted from various minerals by dissolving the gallium oxide in an aqueous alkali metal hydroxide solution, such as a 10-20 per cent solution of sodium or potassium hydroxide. However, minerals containing gallium oxide frequently also contain a large proportion of alumina which also dissolves in such solutions to form alkali metal aluminate. Since the percentage of gallium oxide in the ore is very small (reported analyses range from less than 0.001 per cent to 0.01 per cent), the solutions produced when dissolving gallium oxide from such ores by means of an alkali metal hydroxide solution contain a very large proportion of alkali metal aluminate and only a small proportion of dissolved gallium.

It has been stated in the literature ("Das Gallium," by Einecke, published in 1944 by J. W. Edwards, page 92) that gallium oxide and hydroxide, dissolved in alkali metal hydroxide solutions, form alkali metal gallates which are analogous to the corresponding aluminates. Since there is, however, some uncertainly about their constitution, I have preferred to designate such an alkaline solution merely as one containing dissolved gallium, thus making no assumptions as to the actual chemical compound of gallium present in the solution.

Ordinarily when gallium oxide is precipitated from solutions of the type mentioned above by adding an acid or acid salt to the solution, alumina also precipitates, and since the amount of alkali metal aluminate in the solution is so much larger than the amount of dissolved gallium present, the proportion of alumina to gallium oxide in the precipitate is quite large. Consequently, if it is attempted to recover metallic gallium by dissolving the precipitate in a suitable solvent and then precipitating gallium from the resulting solution by previously proposed methods, the gallium concentration of that solution is too small for economical extraction of gallium.

A method of avoiding that difficulty is described in the co-pending United States patent application of Francis C. Frary, Serial No. 739,538, filed April 5, 1947, and entitled "Process of Producing Metal," in which dissolved aluminum values are insolubilized by converting aluminum-kali metal aluminate in the original gallium-kali metal aluminate to alkali metal hydroxide and precipitated calcium aluminate, while leaving the gallium in solution. After that step, gallium oxide can be precipitated from the solution by introducing an acidic material thereinto, and the precipitated gallium oxide can then be removed and dissolved in a solvent to form a solution from which metallic gallium is recovered.

I have found that precipitation of gallium oxide by the addition of an acidic material to an alkali metal hydroxide solution containing dissolved gallium is facilitated if alumina is co-precipitated with the gallium oxide as a result of the presence in the solution of sufficient alkali metal aluminate to provide an atomic ratio of dissolved aluminum to dissolved gallium of at least 25:1. With lower atomic ratios of aluminum to gallium, precipitation of gallium oxide from the solution is much more difficult, and becomes increasingly difficult as the atomic ratio becomes smaller. On the other hand, it is preferred that the atomic ratio of aluminum to gallium in the solution be no greater than 100:1 in order that the proportion of alumina to gallium oxide in the precipitate produced shall be sufficiently low to minimize the cost of extraction of gallium by dissolving the precipitate and subsequently precipitating metallic gallium from the solution thus produced. By precipitating gallium oxide from a solution in which the ratio of dissolved aluminum to gallium lies within the above range, it is feasible to produce precipitates without difficulty which contain gallium oxide equal to 2 per cent of the weight of the alumina values in the precipitate.

Accordingly in carrying out this phase of my invention, after an alkali metal aluminate solution with gallium dissolved therein has been produced in which the atomic ratio of dissolved aluminum to gallium is greater than 100:1, part of the aluminum is insolubilized to produce a solution in which the atomic ratio of dissolved aluminum to dissolved gallium is at least 25:1, but preferably is not greater than 100:1. Such insolubilization of aluminum can be effected satisfactorily in accordance with the procedure described in the above-mentioned application of Francis C. Frary of mixing sufficient hydrated lime or quick lime with the original solution—which preferably is maintained at a temperature of above 100° F.—to react with the necessary proportion of the alkali metal aluminate in the solution and form calcium aluminate and alkali metal hydroxide, and leave a solution having a ratio of dissolved aluminum to dissolved gallium within the above-mentioned range. If the original solution contains ingredients other than alkali metal aluminate which react with the calcium compound added, it is, of course, necessary to use sufficient lime for such side reactions, as well as for the formation of the desired amount of calcium aluminate. Also, part of the dissolved aluminum may be precipitated as aluminum hydroxide by other known processes, if desired, before adding the calcium compound.

After the above-mentioned precipitation of aluminum values from the solution, hydrous gallium oxide and alumina are co-precipitated from the solution by introducing an acid or acid salt into it. Next the precipitate thus produced is dissolved in an aqueous alkali metal hydroxide solution, such as a sodium or potassium hydroxide solution, forming an alkali metal aluminate solution containing dissolved gallium. Metallic gallium is then extracted from that solution by electrodeposition. Suitable procedures for the electrodeposition of gallium from alkaline solutions are well-known and set forth in the literature, and consequently will not be described here.

As the gallium concentration of the electrolyte decreases during the electrodeposition operation, more and more electrical energy is required to precipitate a given amount of gallium, until ultimately further precipitation of gallium from the solution becomes uneconomical, although some dissolved gallium still remains in the solution. To recover such dissolved gallium and separate it from much of the alumina content of the electrolyte, I mix the "spent" electrolyte with a further quantity of alkali metal aluminate solution containing dissolved gallium, which has been produced as mentioned above by treating an ore with an aqueous alkali metal hydroxide solution, and employ the mix in the production of further metallic gallium in accordance with the procedures already described herein. In other words, the alumina-gallium oxide ratio of the mix is adjusted by insolubilizing dissolved aluminum values as described previously, and thereafter gallium oxide and alumina are co-precipitated from the solution, and the gallium oxide is converted to gallium in the manner previously set forth. In this way the gallium content of the spent electrolyte is recovered as gallium oxide—together with additional gallium oxide from the solution that was mixed with the spent electrolyte—and goes into the production of further electrolyte from which metallic gallium is to be extracted.

In the step mentioned above of co-precipitating the alumina and gallium oxide, carbon dioxide (which may be in the form of gas, carbonic acid, or sodium bicarbonate) is the acidic material preferred as the precipitant. The precipitate produced by such use of carbon dioxide contains a substantial proportion of combined alkali metal and carbon dioxide, apparently in the form of an alkali metal aluminum carbonate. Although the precipitate obtained can be dissolved in an alkali metal hydroxide solution to produce the solution from which metallic gallium is to be precipitated, I have found that the precipitate can be dissolved much more readily if it has first been heated at a temperature of at least 300° C. to drive off carbon dioxide. By that procedure alkali metal aluminate is apparently formed which dissolves readily in aqueous solutions and thus permits the solvent to reach the gallium oxide quickly.

The duration of the heating operation depends on such factors as the proportion of combined carbon dioxide which is to be driven off, the temperature employed, the physical state of the material heated, and cost considerations. In general, the higher the temperature at which the precipitate is heated, the shorter the period required for removing a given amount of carbon dioxide. Ordinarily a temperature of 350–600° C., and a heating period from one-half hour to four hours are preferred.

I claim:

1. The process of producing gallium comprising the steps of forming an aqueous alkali metal aluminate solution containing dissolved gallium, decreasing the atomic ratio of aluminum to gallium in the resultant solution by insolubilizing sufficient of the dissolved aluminum values of that solution as calcium aluminate that the atomic ratio of dissolved aluminum to dissolved gallium in the solution lies in the range of from 25:1 to 100:1, subsequently co-precipitating gallium oxide and alumina from the said solution by introducing an acidic material thereinto, dissolving the co-precipitated gallium oxide and alumina in an aqueous alkali metal hydroxide solution, electrodepositing part of the dissolved gallium from the resultant solution as metallic gallium, thereafter mixing the gallium-bearing electrolyte from the last-mentioned step with additional aqueous alkali metal aluminate solution containing dissolved gallium, and employing the resultant mixture in the said second-mentioned step in further operation of the process.

2. The process of producing gallium comprising the steps of forming an aqueous alkali metal aluminate solution containing dissolved gallium in which the atomic ratio of dissolved aluminum to dissolved gallium is greater than 100:1, insolubilizing sufficient of the dissolved aluminum values of that solution that the atomic ratio of dissolved aluminum to dissolved gallium in the solution lies in the range of from 25:1 to 100:1, subsequently co-precipitating gallium oxide and alumina from the resultant solution by introducing an acidic material thereinto, dissolving the co-precipitated gallium oxide and alumina in an aqueous alkali metal hydroxide solution, electrodepositing part of the dissolved gallium from the resultant solution as metallic gallium, thereafter forming additional aqueous alkali metal aluminate solution containing dissolved gallium in which the atomic ratio of dissolved aluminum to dissolved gallium is greater than 100:1 by mixing the said electrolyte with further alkali metal aluminate solution containing dissolved gallium, and employing the resultant mixture in the said second mentioned step in further operation of the process.

RALPH WALDO BROWN.

REFERENCES CITED

The following references are of record in the file of this patent:

UNITED STATES PATENTS

| Number | Name | Date |
|---|---|---|
| 461,416 | Bradbum et al. | Oct. 20, 1891 |
| 663,167 | Hall | Dec. 4, 1900 |
| 941,799 | McCullough | Nov. 30, 1909 |
| 1,013,022 | Kendall | Dec. 26, 1911 |
| 1,855,455 | McCutcheon | Apr. 26, 1932 |
| 1,971,354 | Scheidt et al. | Aug. 28, 1934 |
| 2,320,773 | Fink et al. | June 1, 1943 |
| 2,361,143 | Leute et al. | Oct. 24, 1944 |

FOREIGN PATENTS

| Number | Country | Date |
|---|---|---|
| 381,520 | Great Britain | Oct. 6, 1932 |
| 423,594 | Great Britain | Jan. 31, 1935 |

OTHER REFERENCES

Friend: Textbook of Inorganic Chemistry, vol. 4 (1917), p. 145.

Caven and Lander: "Systematic Inorganic Chemistry," pp. 158–160 (1932).